Aug. 12, 1969 SHIGERU YOSHIDA 3,460,193
CUTTER FOR REMOVING DARK MEAT IN FISH MEAT
Filed July 10, 1967 3 Sheets-Sheet 1

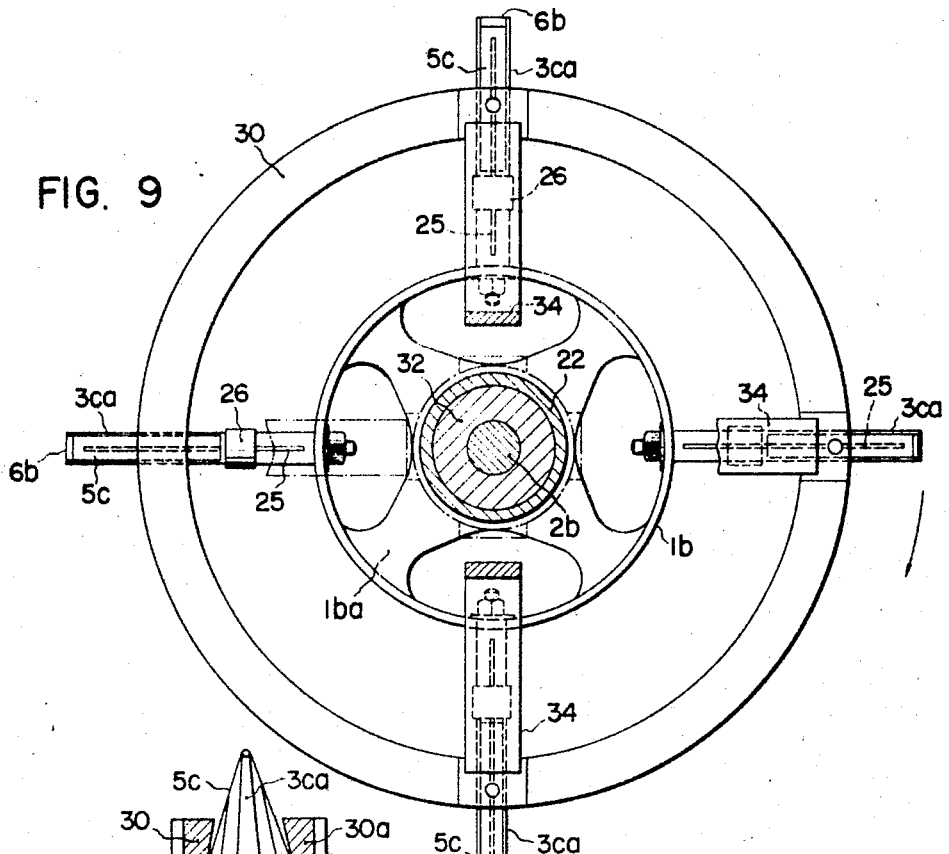
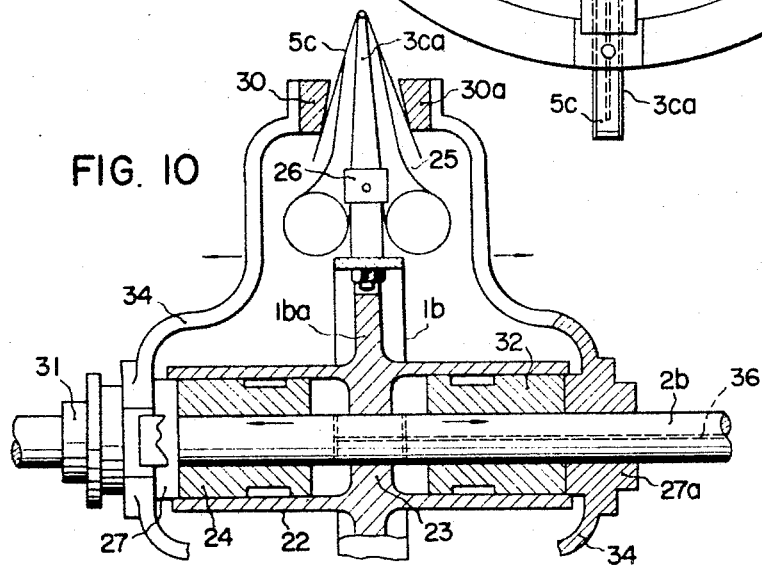

United States Patent Office 3,460,193
Patented Aug. 12, 1969

3,460,193
CUTTER FOR REMOVING DARK MEAT IN FISH MEAT
Shigeru Yoshida, 5–28, 3-Chome, Mochimune,
Shizuoka-shi, Shizuoka-ken, Japan
Filed July 10, 1967, Ser. No. 652,251
Claims priority, application Japan, Sept. 14, 1966,
41/60,971
Int. Cl. A22c 25/00; B26d 1/36, 3/02
U.S. Cl. 17—61                4 Claims

ABSTRACT OF THE DISCLOSURE

Tool holders are mounted radially on the outer periphery of rotating flywheel and provided respectively with V-shaped cutting tools each formed by a pair of knife blades hinged at their outer end edges to an edge at the extreme outer tip of the corresponding tool holder to form a dihedral angle, which can be controllably varied by a mechanism actuated by centrifugal force as determined by the controllable speed of the flywheel or by a controllable hydraulic or electromagnetic actuator. The dihedral angles of all pairs of knife blades, which are substantially equal, are thus varied in unison to produce cutting action conforming to the configuration of dark meat in fish meat being processed thereby to remove the dark meat.

---

This invention relates generally to machines and devices such as cutters for mechanically processing meat or flesh of animals and fishes.

More particularly, the invention concerns a new cutter mechanism for removing dark meat of fish meat.

The term "dark meat" is used herein to designate the reddish black meat containing vascular plexuses in some parts of certain food fishes, particularly sardines, bonitos, skipjacks, tunas, and mackerals. Dark meat contains much blood and fish oil and has an unpleasant fishy taste, which, together with the contrasting appearance, lowers the commercial value of the remainder of the meat in which the dark meat is present, especially with respect to consumers in Europe and the Americas, unless the dark meat is removed.

Heretofore, dark meat in firsh meat has been removed principally by manual operation, which is troublesome because of the peculiar configuartion of the dark meat as described hereinafter.

It is an object of the present invention to provide a power operated cutting mechanism for cleanly removing dark meat by cutting action which can be controlled to follow the configuration of the dark meat without damaging the desired remainder of the meat thereby to increase the efficiency of the work of removing dark meat, particularly in the meat preparation process in canning operations.

Another object of the invention is to provide a cutting mechanism of the above stated character which has a relatively simple construction and operation.

Briefly summarized, the present invention resides in a cutting mechanism for removing dark meat in meat to be processed characterized by the combination of a power driven flywheel, a plurality of tool holders mounted radially on the peripheral surface of the flywheel and having pointed outer extremities, a pair of knife blades having outer ends hinged at the outer extremity of each tool holder on opposite sides thereof to form a dihedral V-shaped cutting tool of variable V or dihedral angle between the knife blades, and a mechanism for varying the dihedral angle of the knife blades in accordance with the rotational speed of the flywheel or in accordance with actuation produced by a hydraulic system including a hydraulic motor incorporated within the cutter and a hydraulic pressure control means operable from the outside or by an electromagnetic actuation device.

The details, principle, and details of the invention will be more clearly apparent from the following detailed description with respect to preferred embodiments of the invention when read in conjunction with the acompanying drawings, in which like parts are designated by like reference numerals and characters.

In the drawings:

FIG. 9 is an elevational view, with some parts cut away, of the mechanism shown in FIG. 8 as viewed therein orthogonally from the left; and FIG. 10 is a partial elevational view similar to FIG. 8 but showing the mechanism in the state wherein the knife blades of each cutting tool are spread out to a relatively large dihedral angle.

Figure 1:
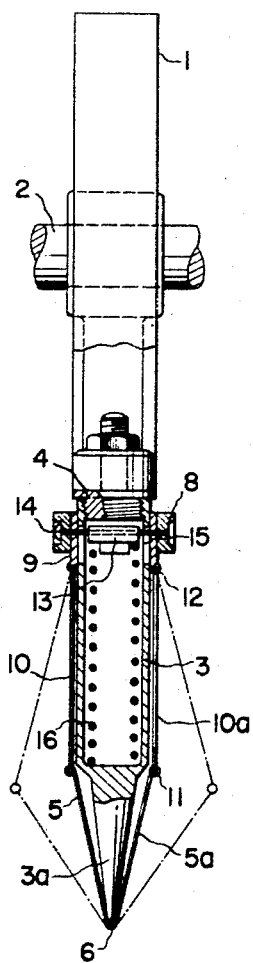
FIG. 1 is an elevational view, partly in section with parts cut away, showing an example of a cutting mechanism embodying the invention.

In one aspect of the invention as illustrated in FIGS. 1, 2, 3, and 6, a flywheel 1 of a suitable diameter is mounted on a horizontal driving shaft 2 and supports on its periphery a number of tool holder cylinders 3 disposed in radial arrangement and respectively screwed at their base parts onto mounting studs 4 fixed to the rim of the flywheel. The outer end of each tool holder cylinder is tapered into the form of wedge with a chisel tip edge and constitutes a blade tip support 3a. All tool holder cylinders 3 are so aligned that the chisel tip edges of their respective blade tip supports 3a revolve in one circle concentric with the flywheel, the edges of the chisen tips lying in the plane of the circle.

A pair of left and right knife blades 5 and 5a of substantially flat shape are connected at their outer end edges by a hinge joint 6 to the chisel tip edge of each blade tip support 3a and thereby can pivot about the chisel tip edge to form a V-shaped cutting tool of variable dihedral angle between the blades. The leading edge with respect to the intended cutting action of each knife blade is sharpened to a cutting edge.

The inner ends (upper ends as viewed in FIG. 3) of each pair of knife blades 5 and 5a are connected by hinges 11 respectively to the outer ends of a corresponding pair of left and right blade angle setting links 10 and 10a connected respectively at their inner ends by hinge joints 12 to the outer ends of a pair of corresponding left and right guide members 9. The guide members 9 are connected to a slide collar 8 slidably fitted on the base shank part of the tool holder cylinder 3.

A spring compressing head 13 is supported within and connected to each slide collar 8 by a pin 14 passed diametrically through the slide collar 8 and the head 13, thereby being movable together with the sliding collar 8. The pin 14 slidably fits in and is guided by longitudinal slots 15 formed in diametrically opposite sides of the cylindrical wall of the tool holder cylinder 3, whereby the compressing head 13 is permitted to move outward toward the outer end of the cylinder 3 to compress a precompressed helical spring 16 contained within the hollow interior of the tool holder cylinder 3 and abutting at its inner end against the compressing head 13.

Thus, the spring 16 is constantly imparting a force on the compressing head 13 urging the head 13 and the collar 8 inward toward the flywheel 1. This spring force on the sliding collar is transmitted through the guide members 9 to the aforementioned blade angle setting links 10 and 10a, which are thereby in a state wherein they tend to exert an inward force on the knife blades 5 and 5a thereby to urge these blades to close toward the tool holder cylinder 3.

However, as the rotational speed of the flywheel 1 increases, the sliding collar 8 slidably fitted on the cylinder 3 is caused by centrifugal force to begin sliding outward, overcoming the force of the spring 16, thereby progressively moving the links 10 and 10a outward. Consequently, the knife blades 5 and 5a are spread apart, that is, the V or dihedral angle therebetween is increased.

Figure 3:
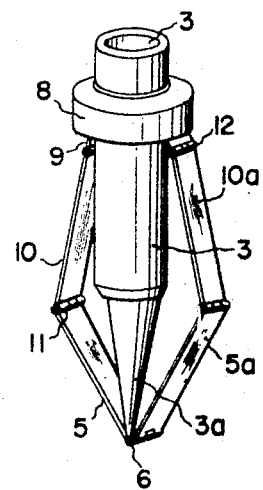
FIG. 3 is a perspective view showing one assembly of a cutting tool holder member, a V-shaped cutting tool, and a knife blade actuating mechanism of the cutting mechanism shown in FIGS. 1 and 2.

While the left and right knife blades 5 and 5a are illustrated in FIGS. 1 and 3 as having equal lengths, the present invention is not limited to such arrangement, being applicable also to the case wherein knife blades of respectively different lengths are used, in which case the left and right angles of opening of the knife blades pivoting about the hinge joint 6 can be caused to be different. In this manner, the blades can be caused to open to angles suitably corresponding to conditions such as the configuration and depth of dark meat.

Figure 4:
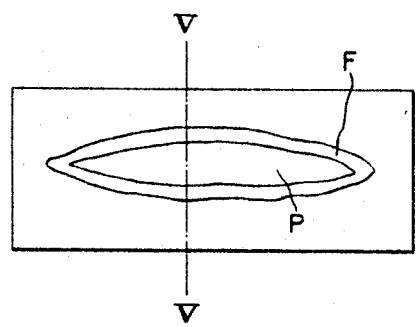
FIG. 4 is a simplified plan view showing a piece of meat in which dark meat is present.
Figure 5:
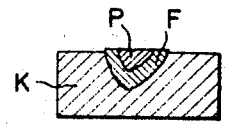
FIG. 5 is an elevational sectional view taken along the plane indicated by line V—V in FIG. 4.

When raw fish meat or boiled fish meat (for example, raw bonito meat) is cut into a number of longitudinal slices, pieces of meat each of substantially bar shape with dark meat P imbedded in one surface thereof are obtained. The dark meat portion of each piece is then cut away, and the remainder part of the meat F is used for purposes such as canning. The form of the dark meat is normally made up of curvilinear lines, and the cross section at each part thereof is approximately of V shape as indicated in FIG. 5. Moreover, the longitudinal ends of the dark meat portion are narrow is indicated in FIG. 4 and of shallow thickness, while the middle part is wide and thick. Accordingly, the present invention contemplates digging downward into the dark meat of special form from both sides to cut away this dark meat away from the desirable meat in the following manner.

The pieces of meat with dark meat parts are placed into suitable vessels K respectively suitable for holding these pieces of meat, the dark meat parts being exposed in the upward direction. Then, as the vessels K holding the pieces of meat are continuously conveyed along a specific path (for example, in the direction of arrow Q in FIG. 6) by a suitable feeding conveyer device (not shown), the pieces of meat are subjected to the above mentioned dark meat gouging operation by the cutter of the invention, which is mounted above the path of conveyance of the meat pieces and caused to contact the meat surfaces as it is rotated.

In one mode of operation of the cutting mechanism of the invention, each vessel holding a piece of meat is caused by a suitable device (not shown) to rise and descend slightly on the conveyance path so that the knife blades of the cutter penetrate as necessary to a shallow depth or a deep depth relative the piece of meat held by the vessel. At the same time, by varying the rotational speed of the flywheel at necessary times during the conveyance of the pieces of meat, the opening of the knife blades due to centrifugal force is suitably adjusted thereby to adjust automatically the dihedral angle of opening of the two knife blades of each pair in suitable correspondence with the widths of the parts being cut.

In this manner, each of the pieces of meat passing by and below the cutter is subjected by the rotating cutting action of the knife blades in V-shaped assembly to a narrow and shallow cut in the beginning, then to a wide and deep cut in the middle part, and finally to a narrow and shallow cut in the end part, whereby a gouging operation following the configuration of the dark meat is accomplished.

The rotational speed of the flywheel and the conveying speed of the meat holding vessels are preferably controlled by automatic electrical means (not shown) operating under a program preset in accordance with the configurations of the pieces of meat to be gouged.

Figure 8:
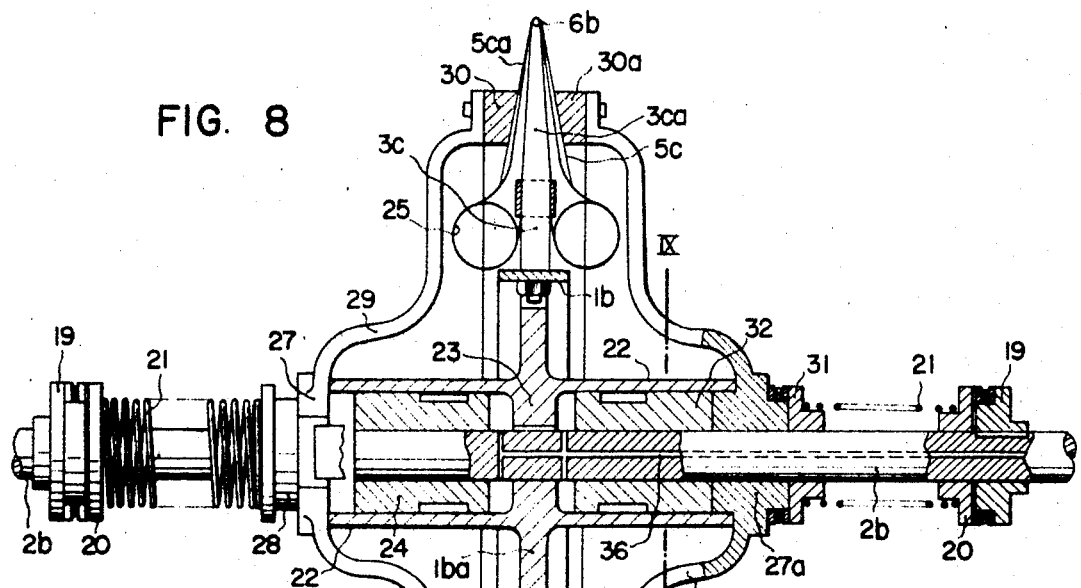
FIG. 8 is an elevational view, mostly in longitudinal section, showing an example of another embodiment of the invention in which the dihedral angle between the cutting blades is hydraulically controlled.
Figure 6:
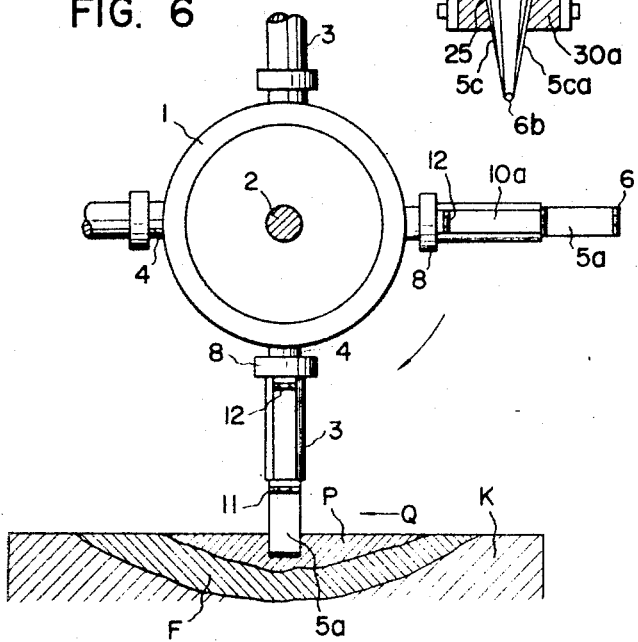
FIG. 6 is a simplified elevational view in the direction of the rotational axis of the flywheel of a cutting mechanism of the invention showing the cutting action thereof with respect to dark meat in a piece of meat.
Figure 7:
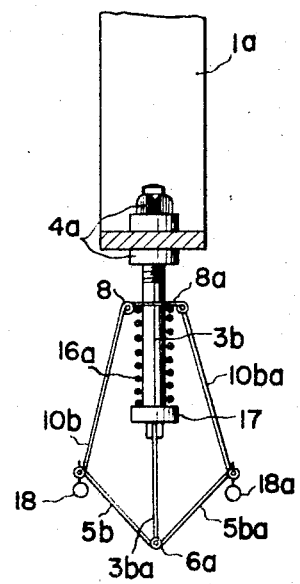
FIG. 7 is an elevational view similar to FIG. 1 showing another example of a cutting tool and related mechanism provided with balance weights in accordance with the invention.

The opening and closing action of the knife blades of the cutter of the invention is not limited to that accomplished by the centrifugal force acting on the sliding collar 8 as described above, other means for accomplishing this action also being possible. For example, as shown in FIG. 7, this action may be accomplished by means of balance weights coupled to the knife blade supporting parts and operating in the manner of a governor. As another example, as shown in FIGS. 8, 9, and 10, arm members rotating together with the knife blades may be provided and caused to deflect in the rotational axial direction by hydraulic or electromagnetic means to cause opening and closing of the knife blades.

Figure 2:
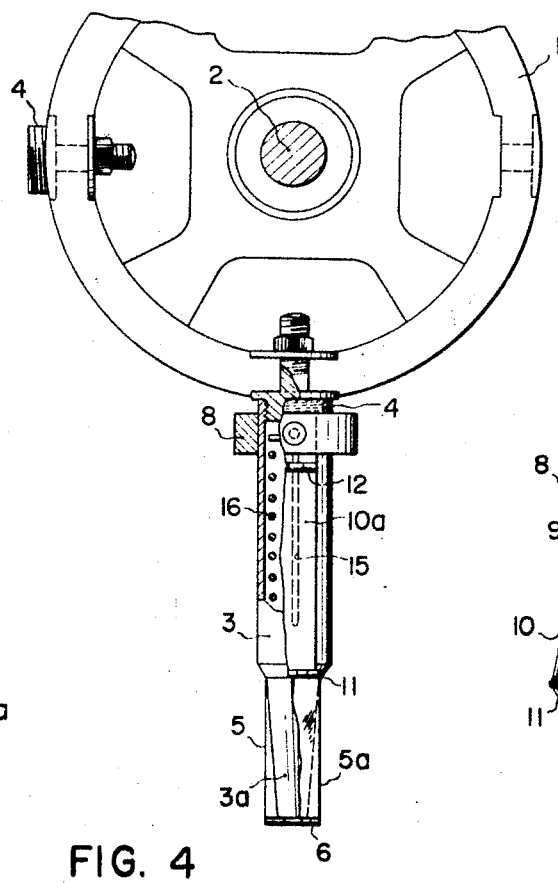
FIG. 2 is an elevational view, partly in section with parts cut away, of the cutting mechanism shown in FIG. 1 as viewed therein orthogonally from the right.

In the embodiment of the invention as illustrated in FIG. 7, a flywheel 1a is driven by a horizontal driving shaft (not shown) similarly as in the cutter illustrated in FIGS. 1 and 2. At suitable space intervals on the periphery of the flywheel 1a, there are provided tool supporting stems 3b fixed to the flywheel 1a by fastening means 4a. A base plate 8a is slidably fitted on each stem 3b, and a spring retainer 17 is fixed to the outer end of the stem 3b. A helical spring 16a is interposed between the base plate 8a and the spring retainer 17.

Each tool supporting stem 3b supports at its outer end a tip support plate 3ba fixed thereto. One end of each of two knife blades 5b and 5ba of a pair is pivoted by a hinge joint 6a to the extreme outer end of each tip support plate 3ba. The other, or inner, ends of the two knife blades are hinged respectively to the outer ends of blade angle setting links 10b and 10ba, which are hinged at their inner ends to opposite ends of the base plate 8a. Balance weights 18 and 18a are respectively supported at the hinge joints between the knife blades and their respective links.

Thus, in the example illustrated in FIG. 7, each combination of blade angle setting links 10b and 10ba, knife blades 5b and 5ba, and balance weights 18 and 18a constitutes a kind of governor mechanism. Accordingly, the V angle between each pair of knife blades 5b and 5ba varies in accordance with the rotational speed of the flywheel 1a. Therefore, by suitably varying the speed of the flywheel, it is possible to vary as desired the angle with which the knife blades bite into the meat, similarly as in the example illustrated in FIGS. 1, 2, and 3.

In the embodiment of the invention illustrated in FIGS. 8, 9, and 10, there is provided a main driving shaft 2b driven by a suitable prime mover (not shown) and supporting a hydraulic cylinder 22 coupled to and coaxially disposed around the shaft 2b. The interior of the hydraulic cylinder 22 is divided into left and right cylinder chambers (as viewed in FIGS. 8 and 10) by a central partition wall 23 of disk shape formed integrally with the cylinder 22 and perpendicularly to the cylinder axis and provided with a through hole through which the main shaft 2b is passed. The partition wall 23 is fixed at its through hole to the main shaft 2b.

Pistons 24 and 32 are slidably disposed respectively within the left and right cylinder chambers of the cylinder 22 and are adapted to be operated by hydraulic pressure applied between their respective opposed heads at their inner ends and the central partition wall 23. This hydraulic pressure is controllably applied by a hydraulic system (not shown) including a hydraulic pump and pressure control means through a hydraulic fluid passage 36 formed through the center of the main driving shaft 2b to inlet ports on the two sides of the partition wall 23 in close proximity thereto.

A flywheel consisting essentially of a rim 1b and a wheel disk or web 1ba is fixed coaxially to the cylinder 22 at its center part. The rim 1b supports around its peripheral surface a plurality of tool holder members 3c aligned in radial directions and having tapered tip parts 3ca each of which has left and right (as viewed in FIG. 8) inclined surfaces converging to a chisel tip edge which is tangent to the cutting path.

A pair of knife blades 5c and 5ca are connected at their outer ends by a hinge joint 6b or a pivot to the chisel edge line at the extreme tip of each tip part 3ca and confront respective inclined surfaces thereof. The inner ends of the knife blades 5c and 5ca are free and can be moved toward or away from the inclined surfaces of the tip part 3ca. That is, the two knife blades form a V-shaped cutting tool of variable dihedral angle therebetween. The leading edge of each knife blade is sharpened to a cutting edge.

Between the inner surface of each knife blade and the corresponding lateral side of the tool holder member 3c, there is fitted a spring 25 having an inner base part of circular form for elasticity and exerting at its outer end an elastic force on the knife blade in the direction for opening the blade, that is, away from the opposite knife blade. Each spring 25 is connected at its base part to the corresponding tool holder member 3c by a connector 26.

At the two outer ends of the aforementioned hydraulic cylinder 22, there are respectively provided sliding hubs 27 and 27a abutting against the outer ends of the pistons 24 and 32 and slidably fitted around the main driving shaft 2b. The outer end of each sliding hub is outside of the cylinder and is in contact with a spring compressing collar 31 slidably fitted around the main shaft 2b. The middle parts of the sliding hubs 27 and 27a respectively support in an integral manner left and right symmetrical groups of radial spokes 34 and 34a, there being four spokes in each group in the illustrated example. One spoke 34 of the left group and one spoke 34a of the right group are symmetrically aligned to form a pair corresponding to a respective pair of knife blades 5c and 5ca.

The outer ends of the spokes 34 and spokes 34a are fixed to a pair of blade compressing rings 30 and 30a constituting pressure shoes and support these rings in a coaxial state relative to the main shaft 2b. The rings 30 and 30a are thus disposed in mutually parallel, spaced apart, and opposed relation and have opposed surfaces which are inclined and converge in the radially outward direction, and which contact the outer sides of all knife blades 5c and 5ca.

Each of the aforementioned spring compressing collars 31 is in contact with the inner end of a compressible helical spring 21 of high spring constant disposed around the main shaft 2b and held at its outer end by a spring retainer 20 held in turn by a fixing collar 19 which is fixed at a suitable point to the main shaft 2b. The left and right springs 21 exert inward forces by way of the collars 31 on their respective sliding hubs 27 and 27a and, therefore, the blade compressing rings 30 and 30a.

Thus, the springs 21, collars 31, sliding hubs 27 and 27a, and blade compressing rings 30 and 30a constitute a compressing mechanism which constantly exerts from two sides compressing forces on the pairs of knife blades 5c and 5ca connected with V-shaped angles to respective tool holder members on the periphery of the flywheel 1b, these forces being in directions for closure of each pair of knife blades, which, therefore, tends to form a V shape of relatively sharp dihedral angle as indicated in FIG. 8.

However, when hydraulic pressure is applied through the hydraulic fluid passage 36 to the interior of the hydraulic cylinder 22, the pistons 24 and 32 are forced outward to cause the sliding hubs 27 and 27a to overcome the forces of the springs 21 and slide outward, and these movements are transmitted through the spokes 34 and 34a to cause the rings 30 and 30a to move apart. As a result, the V-shaped pairs of knife blades are caused by springs 25 to open and assume a V shape of relatively dull (less acute) dihedral angle, as indicated in FIG. 10.

Then, as the hydraulic pressure is gradually decreased, the forces of the springs 21 cause the rings 30 and 30a to press the knife blades as before from two sides, whereby the pairs of knife blades again assume a V shape of relatively sharp angle.

Thus, each cutting tool under rotation is capable of gouging out dark meat with a narrow cut or a wide cut, as necessary, with a single set of cutting edges. The required angles of the knife blades may be automatically controlled by controlling the hydraulic action by a system wherein the hydraulic fluid quantity to be injected is predetermined.

As described above, the present invention provides a cutter in which a plurality of pairs of V-shaped knife blades connected in a radial state to the outer peripheral surface of a rotating flywheel can be automatically actuated to vary the angle of their V shape, whereby the dark meat of pieces of meat conveyed continuously past the cutter can be cut out and removed in accordance with the configuration thereof. Accordingly, the present invention affords a cutter whereby work efficiency can be remarkably increased above that attainable heretofore by the conventional manual cutting operation.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention.

What I claim is:

1. A cutter mechanism for removing dark meat of meat to be processed comprising: a flywheel fixed to and supported by rotating shaft driven by a prime mover; a plurality of cutting tool holder members mounted in a radial state on the outer peripheral surface of the flywheel; a pair of knife blades mounted on the radially outer end of each cutting tool holder and having radially outer ends hinged to form a V-shaped cutting tool; and a mechanism for adjusting the dihedral angle between the knife blades of each V-shaped cutting tool, all of the V-shaped cutting tools being caused by the rotation of the flywheel to cut out and remove dark meat from meat to be processed.

2. A cutter mechanism for removing dark meat of meat to be processed comprising: a flywheel fixed to and supported by a rotating shaft driven by a prime mover; a plurality of cutting tool holder cylinders mounted in a radial state on the outer peripheral surface of the flywheel and respectively having radially outer ends tapered outwardly to chisel tips; a pair of knife blades having radially outer ends hinged to the chisel tip of each cutting tool holder cylinder to form a V-shaped cutting tool; a sliding collar fitted on the cylindrical surface of each cutting tool holder cylinder in a manner permitting sliding in the axial direction of said cylinder; a pair of blade angle setting links hinged at their inner ends to each of the sliding collars and at their outer ends respectively to the inner ends of the corresponding knife blades; a spring mechanism for constantly urging each sliding collar toward the flywheel; and control means to control the rotational speed of the flywheel, all of the V-shaped cutting tools being caused by the rotation of the flywheel to cut out and remove dark meat from meat to be processed, and the dihedral angle between the knife blades of each V-shaped cutting tool being controllably adjusted by said control means controlling the rotational speed of the flywheel.

3. A cutter mechanism for removing dark meat of meats comprising: a rotating shaft driven by a prime mover; a hydraulic cylinder fixed coaxially to the shaft; a flywheel mounted coaxially around the outer, middle part of the hydraulic cylinder; a plurality of cutting tool holder stems mounted in a radial state on the outer peripheral surface of the flywheel; a pair of knife blades having outer ends pivoted at the extreme tip of each cutting tool holder stem to form a V-shaped cutting tool with variable dihedral angle between the knife blades thereof; springs urging each pair of knife blades in directions for increasing said dihedral angle; a pair of opposed pistons disposed within the hydraulic cylinder and adapted to be actuated by hydraulic fluid introduced into a cylinder chamber therebetween; a hydraulic system including hydraulic pressure control means and connected to supply controlled hydraulic pressure to the cylinder chamber between the pistons; sliding hubs slidably fitted on the rotating shaft and disposed in contact respectively with the outer ends of the two pistons; a pair of pressure shoes respectively contacting the outer sides of the two knife blades of each cutting tool; a pair of support arms connected respectively to the two sliding hubs and respectively supporting the two pressure shoes of each pair; and spring mechanisms for exerting forces on each pair of support arms thereby to cause the corresponding pair of pressure shoes to press together the knife blades in contact therewith, the positions in the shaft axial direction of the support arms and, therefore, the dihedral angles between the knife blades of all V-shaped cutting tools being controllably adjusted by controlling hydraulic pressure on the pistons by the operation of the pressure control means.

4. A cutter mechanism for removing dark meat of meat to be processed comprising: a flywheel fixed to and supported by a rotating shaft driven by a prime mover; a plurality of cutting tool holder stems mounted in a radial state on the outer peripheral surface of the flywheel, each of said stems having a thin outer extremity in the form of an edge parallel to the plane of rotation of the flywheel; a sliding base plate slidably fitted on each of said stems; a spring for urging each sliding base plate toward the flywheel; a pair of knife blades having outer ends hinged to the edge of the outer extremity of each stem to form a V-shaped cutting tool of variable dihedral angle between its knife blades; a pair of connecting links pivotally connected at their inner ends respectively to opposite side ends of each sliding base plate and at their outer ends to the respective inner ends of the corresponding pair of knife blades, articulated joints being thus formed between the connecting links and the corresponding knife blades; a balance weight connected at each of said articulated joints; and control means for controllably adjusting the rotational speed of the flywheel, all of the V-shaped cutting tools being caused by the rotation of the flywheel to cut out and remove dark meat from meat to be processed, and the dihedral angle between the knife blades of each V-shaped cutting tool being adjusted by said control means.

References Cited

UNITED STATES PATENTS 2,565,727   8/1951   Henderson _____ 17—4

LUCIE H. LAUDENSLAGER, Primary Examiner

U.S. Cl. X.R.

17—52, 56; 83—321, 591; 144—136; 146—106